(12) United States Patent
Hecker et al.

(10) Patent No.: US 7,746,552 B2
(45) Date of Patent: Jun. 29, 2010

(54) ILLUMINATION MODULE FOR EVANESCENT ILLUMINATION AND MICROSCOPE

(75) Inventors: Andreas Hecker, Asslar (DE); Werner Knebel, Kronau (DE); Kyra Moellmann, Trippstadt (DE); Heinrich Ulrich, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 12/435,208

(22) Filed: May 4, 2009

(65) Prior Publication Data

US 2009/0213456 A1   Aug. 27, 2009

Related U.S. Application Data

(60) Division of application No. 11/415,041, filed on May 1, 2006, now abandoned, which is a continuation of application No. PCT/EP2004/052268, filed on Sep. 22, 2004.

(30) Foreign Application Priority Data

Sep. 25, 2003  (DE)  ............... 103 44 410
Sep. 10, 2004  (DE)  ............... 10 2004 044 309

(51) Int. Cl.
  *G02B 21/06*  (2006.01)
(52) U.S. Cl. ............... 359/386; 359/385; 359/388; 250/225
(58) Field of Classification Search ............... 359/386
  See application file for complete search history.

(56) References Cited

U.S. PATENT DOCUMENTS

| | | | |
|---|---|---|---|
| 4,904,085 A * | 2/1990 | Spillman Jr. et al. | ........ 356/364 |
| 5,953,115 A | 9/1999 | Landers et al. | |
| 6,232,588 B1 | 5/2001 | Naya | |
| 6,288,780 B1 | 9/2001 | Fairley et al. | |
| 6,352,502 B1 | 3/2002 | Chaiken et al. | |
| 6,753,970 B1 | 6/2004 | Neumann et al. | |
| 6,987,609 B2 | 1/2006 | Tischer et al. | |
| 7,619,959 B2 * | 11/2009 | Nishi et al. | ............ 369/112.02 |
| 7,633,622 B2 * | 12/2009 | Hecker et al. | ............... 356/445 |
| 2002/0097489 A1 | 7/2002 | Kawano et al. | |
| 2002/0154414 A1 | 10/2002 | Matthae et al. | |
| 2003/0058530 A1 | 3/2003 | Kawano | |
| 2004/0001253 A1 | 1/2004 | Abe et al. | |

(Continued)

FOREIGN PATENT DOCUMENTS

DE   101 08 796 A1   9/2002

(Continued)

OTHER PUBLICATIONS

International Search Report, mailed Nov. 25, 2004, from International Application No. PCT/EP20041052268, filed Sep. 22, 2004.

(Continued)

*Primary Examiner*—Arnel C Lavarias
(74) *Attorney, Agent, or Firm*—Houston Eliseeva LLP

(57) ABSTRACT

A microscope with a light source that produces an illumination light beam for evanescently illuminating a sample includes an adjustment mechanism with which the polarization of the illumination light beam may be changed.

23 Claims, 3 Drawing Sheets

U.S. PATENT DOCUMENTS

2004/0047032 A1    3/2004    Gonschor et al.

FOREIGN PATENT DOCUMENTS

| | | |
|---|---|---|
| DE | 101 43 481 A1 | 3/2003 |
| DE | 102 17 098 A1 | 11/2003 |
| DE | 102 29 935 A1 | 1/2004 |
| EP | 0 054 282 A2 | 11/2000 |
| WO | 98/08219 A1 | 2/1998 |
| WO | 03/023483 A2 | 3/2003 |
| WO | 03/087914 A2 | 10/2003 |

OTHER PUBLICATIONS

International Preliminary Report on Patentability, mailed Aug. 3, 2006, from International Application No. PCT/EP2004/052268, filed Sep. 22, 2004.

* cited by examiner

ILLUMINATION MODULE FOR EVANESCENT ILLUMINATION AND MICROSCOPE

RELATED APPLICATIONS

This application is a divisional application of application Ser. No. 11/415,041, filed May 1, 2006, which is a continuation of PCT Application No. PCT/EP2004/052268, filed Sep. 22, 2004, which in turn claims priority to German Application No. DE 103 44 410.6 filed Sep. 25, 2003, and German Application No. DE 10 2004 044 309.2 filed Sep. 10, 2004, both of which are incorporated herein by reference in their entirety.

FIELD OF THE INVENTION

The invention relates to a microscope with a light source that produces an illumination light beam for evanescently illuminating a sample.

The invention further relates to an illumination module with a light source that produces an illumination light beam.

BACKGROUND OF THE INVENTION

The task of the present invention is to disclose a microscope that enables variable adjustment of the penetration depth of illumination light during evanescent illumination of a sample.

This task is solved by a microscope wherein an adjustment mechanism is provided with which the polarization of the illumination light beam may be changed.

A further task of the present invention is to disclose an illumination module for a microscope that enables illumination of a microscopic sample during evanescent sample of illumination with adjustable penetration depth.

The further task is solved by an illumination module wherein the illumination module can be coupled to a microscope for the purpose of evanescent illumination of a sample, and wherein an adjustment mechanism is provided with which the polarization of the illumination light beam may be changed.

It has been recognized, according to the invention, that the penetration depth (and the light power) of an evanescent illumination field in a sample is dependent on the polarization of the illumination light that strikes the cover glass-sample interface or the sample holder-sample interface, respectively.

By means of the microscope according to the invention or the illumination module according to the invention, respectively, the orientation of sample objects (such as molecules, cell components, etc.) may also advantageously be determined, as well as the corresponding isotropy of the refracted space.

In a preferred variant, the microscope exhibits an objective with an objective pupil, whereby the illumination light beam for evanescently illuminating the sample exhibits a focus in the area of the objective pupil. Preferably, an adjustable beam deflector is provided with which the position of the focus within the objective pupil may be moved. This creates an additional possibility for changing the penetration depth.

It has also been recognized, according to the invention, that in addition to the polarization, the penetration depth of an evanescent illumination field in a sample is dependent on the angle at which total reflection occurs at the cover glass interface or at the sample holder interface, respectively. This angle is directly correlated with the angle relative to the optical axis at which the illumination light beam provided for evanescent sample illumination exits the objective via the front lens. This angle, in turn, is dependent on the distance to the optical axis at which the illumination light beam passes through the rear focal plane of the objective (pupil). In order to have available a largely parallel illumination light beam for evanescently illuminating a sample, the illumination light beam must exhibit a focus in the rear focal plane of the objective. Finally, the distance of the focus to the optical axis of the objective determines said angle, and thereby the penetration depth of the evanescent field in the sample that is to be tested.

In a preferred embodiment of the microscope according to the invention, an adjustable beam deflector is arranged in the beam path of the illumination light beam. The beam deflector preferably comprises at least one galvanometric mirror. In order to position the focus at any given location within the objective pupil, the beam deflector preferably comprises two galvanometric mirrors, which cause deflection of the illumination light beam in different lateral directions (e.g., x- and y-direction). The beam deflector may also comprise rotatable or tippable prisms and/or rotatable or tippable mirrors. The use of acousto-optical or electro-optical deflection elements can also be envisioned.

The adjustment mechanism with which the polarization of the illumination light beam may be adjusted preferably comprises a phase plate, preferably a rotatable $\lambda/2$ plate—preferably motorized. The adjustment mechanism may also comprise a Faraday rotator and/or a Pockels cell and/or a double-refractive material and/or a liquid crystal cell.

In a particularly preferred embodiment of the microscope or of the illumination module, respectively, the adjustment mechanism is the control element of a regulator, which adjusts the polarization according to settings input by the user.

In a very particularly preferred variant, storage memory is provided in which—preferably sample-specific—polarization settings are stored to achieve different penetration depths. In this manner, adjustment, according to the invention, is quantifiable and reproducible.

A control mechanism is preferably provided to measure and/or monitor the polarization of the illumination light beam. In a preferred variant, the control mechanism is the measuring element of the regulator.

Advantageously, the control mechanism may comprise a beam splitter that outcouples the measuring light from the illumination light beam. In an advantageous embodiment, the control element comprises at least one detector that detects the light power of at least a part of the measuring light.

A particularly preferred variant is one in which the control mechanism comprises at least one polarization analyzer, which is preferably arranged in the beam path of the measuring light before the minimum of one detector. It may, for example, be a polarization foil, a double-refractive prism (e.g., a Glan-Thomson prism), or a polarization beam splitter, which may, for example, be implemented as a cube.

In a particular embodiment of the microscope or of the illumination module, respectively, the polarization beam splitter splits the measuring light into an s-polarized measuring beam and a p-polarized measuring beam. Preferably, two detectors are provided, of which one detector receives the s-polarized measuring beam and the other the p-polarized measuring beam. In this manner, precise conclusions may be drawn from the light power measured by both detectors regarding the polarization of the illumination light beam. Preferably, a processing module is provided with which the measurement data are processed. The processing module may also be a component of the regulator.

At least the light source and the adjustment mechanism are preferably integrated into an illumination module that may be detachably coupled to a microscope stand or to an already existent microscope. The illumination module preferably also comprises the control mechanism. A bayonet coupling is preferably provided.

The microscope preferably comprises a camera and/or a CCD element and/or an EMCCD element for the purpose of imaging.

In a preferred variant, a power adjustment mechanism is provided to change the light power of the illumination light beam. This may, for example, be a mechanical beam attenuator, an LCD module, or an electro-optical—or acousto-optical—component (e.g., AOTF).

The microscope preferably comprises a scanning microscope, in particular a confocal scanning microscope.

In a particular variant, at least the light source and the adjustment mechanism are integrated into an illumination module, which preferably may be coupled to a microscope and/or to a microscope stand.

The illumination module according to the invention provides the advantage that it may be coupled as a retrofit to an already existent microscope or microscope stand.

SUMMARY OF THE INVENTION

It is a task of the present invention to disclose a microscope that enables variable adjustment of the penetration depth of illumination light, in particular for evanescent illumination of a sample.

This task is solved by a microscope, wherein an adjustment mechanism is provided with which the spatial position of the focus within the plane of the objective pupil may be changed.

A further task of the present invention is to disclose an illumination module for a microscope that enables illumination of a microscopic sample, in particular for evanescent sample illumination with adjustable penetration depth.

The further task is solved by an illumination module, wherein the illumination module may be coupled to a microscope such that the illumination light beam in the plane of the objective pupil of the microscope exhibits a focus, and wherein the illumination module comprises an adjustment mechanism with which the spatial position of the focus within the plane of the object pupil may be changed.

It has been recognized, according to the invention, that the penetration depth of an evanescent illumination field in a sample is dependent on the angle at which total reflection at the cover glass interface or at the sample holder interface occurs. This angle is directly correlated with the angle relative to the optical axis at which the illumination light beam which is provided for evanescent sample illumination exits from the objective via the front lens. This angle, in turn, is dependent upon the distance from the optical axis at which the illumination light beam passes through the rear focal plane of the objective (pupil). In order to have available a largely parallel illumination light beam for the purpose of evanescent sample illumination, the illumination light beam must exhibit a focus in the rear focal plane of the objective. Finally, the distance of the focus to the optical axis of the objective determines the aforementioned angle, and therewith the penetration depth of the evanescent field in the sample to be tested.

In a preferred embodiment of the microscope according to the invention, the adjustment mechanism comprises an adjustable beam deflector that is arranged in the beam path of the illumination light beam. Preferably, the beam deflector comprises at least one galvanometric mirror. In order to position the focus at any given location within the objective pupil, the beam deflector preferably comprises two galvanometric mirrors, which cause deflection of the illumination light beam in different lateral directions (e.g., x- and y-direction). The beam deflector may also comprise rotatable or tippable prisms and/or rotatable or tippable mirrors. The use of acousto-optical or electro-optical deflection elements can also be envisioned.

In a further embodiment of the invention, the adjustment mechanism comprises a light-conducting fiber which is at least partially movable. In this variant, mechanical positioners are preferably provided that enable the light outgoing end of the light-conducting fiber to be positioned precisely within the objective pupil. The illumination light beam in this further development of the invention is focused onto the light incoming end of the light-conducting fiber, conveyed through the light-conducting fiber, and de facto again exhibits a focus at the outcoupling end that is positioned within the objective pupil, because of the small diameter of customarily used light-conducting fibers.

As previously explained, it is particularly important to adjust the distance of the focus of the illumination light beam in the objective pupil relative to the optical axis of the objective in order to adjust the penetration depth of the evanescent field in the sample region.

It can be particularly advantageous for certain applications to drive the adjustment mechanism such that the focus describes a selectable curve path within the objective pupil plane. By so doing, particularly homogeneous illumination can, for example, be achieved. In certain experiments, it is possible with this variant to effect constant alternation in polarization direction. In a particularly preferred embodiment of the invention, the curve path is a circular path. An embodiment of the invention in which the curve path is a circular path the midpoint of which lies on the optical axis of the objective is very particularly preferred. In this variant, the penetration depth remains constant while the focus describes the circle of the curve path, whereby, however, the illumination light beam that exits from the objective is continuously coupled to the cover glass or to the sample holder from various directions. It is also possible to select different coupling directions in order to compare the resultant, possibly different, images of the sample.

In a very preferred variant, a compensating optic is provided in order to compensate for unevennesses in the objective pupil plane.

Preferably, the microscope objective is exchangeable (e.g., objective turret), whereby a compensating optic is provided to compensate for the various pupil positions of different objectives. The distances between the front focal plane and the rear focal plane may differ from objective to objective, which may lead to problems because in order to achieve optimal evanescent sample illumination, the focus of the illumination light beam must lie more or less exactly in the objective pupil. The aforementioned compensating optic, which may, for example, be a zoom optic or several exchangeable optics arranged on a turret, compensates for these differences in distance.

In a preferred embodiment of the microscope according to the invention, a light trap is provided to eliminate unused illumination light. Only a portion of the illumination light coupled to the cover glass or sample holder actually evanescently illuminates the sample. The light, which again exits from the cover glass or from the sample holder after several total reflections, many return to the microscope again and lead to imaging disturbances (as a result, for example, of scattered light). This is avoided, according to the invention, by a suitably arranged light trap.

In a particularly preferred embodiment of the microscope, a switch is provided for switching between classic incident illumination and evanescent sample illumination. The switch may, for example, comprise a wing mirror.

Preferably, the light cone is variable, in particular for changing the azimuth. An aperture optic such as an iris optic arranged in the intermediate image plane may be provided in order to set the diameter of the illumination light beam that exits from the microscope objective.

In a particular embodiment a camera is provided for imaging. The camera may, in a particularly preferred variant, be implemented as a color camera, or as a CCD camera.

Preferably, the objective exhibits a numeric aperture that is greater than 1.4, in particular greater than 1.45, in particular greater than 1.6. Preferably, the numeric aperture of the objective is 1.45 or 1.65.

In a particular variant, at least the light source and the adjustment mechanism are incorporated in a single illumination module, which can preferably be coupled to a microscope and/or a microscope stand.

The illumination module, according to the invention, offers the advantage that it may be coupled as a retrofit to a preexistent microscope or microscope stand.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
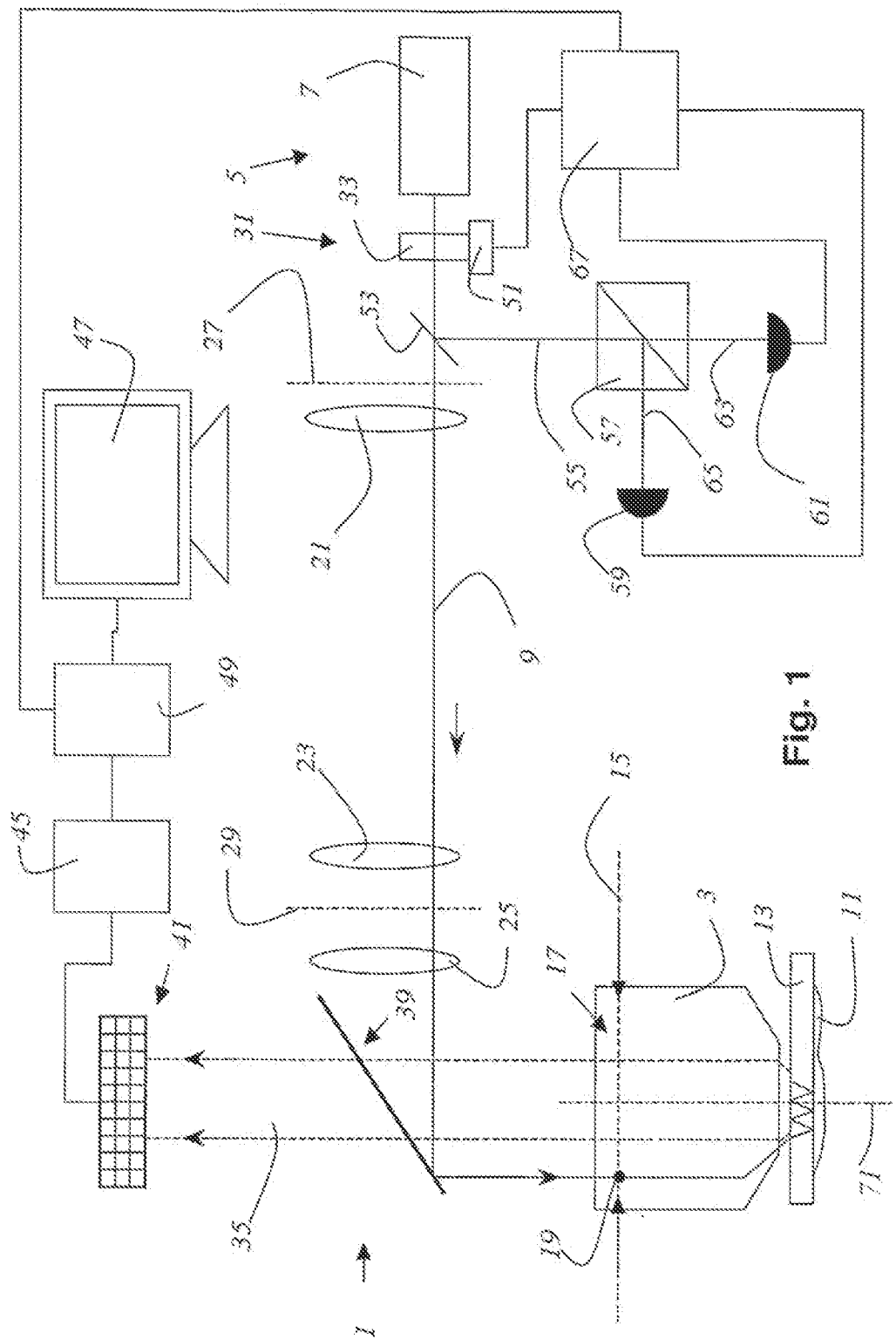
FIG. 1 shows a microscope according to the invention.

FIG. 1 shows a microscope 1 according to the invention with an objective 3 and a light source 5, which is implemented as a laser 7 and which produces an illumination light beam 9. The illumination light beam 9 emitted by the light source 5 enables evanescent illumination of a sample 11 that is positioned on a sample holder 13. The illumination light beam 9 exhibits a focus 19, which is represented by a point, on the plane 15 of the objective pupil 17. Several optical elements for directing and shaping the beam are located in the beam path of the microscope 1. There may, for example, be a first optic 21, a second optic 23, and an optic 25, which produce a first intermediate image plane 27 and a second intermediate image plane 29. An adjustment mechanism 31 is provided with which the polarization of the illumination light beam 9 may be changed. The adjustment mechanism 31 is implemented as a λ/2 plate 33 that is rotatable around the optical axis. For each rotational position of the λ/2 plate 33 there is an associated resultant polarization setting of the illumination light beam 9. The penetration depth in the sample 11 and the light power of the evanescent field may be varied with the adjustment mechanism 31. The λ/2 plate 33 is rotated by a servomotor 51.

The detection light 35 issuing from the sample 11 passes through the objective 3 as well as through the beam splitter 39, which directs the illumination light beam 9 to the objective 3, and through it to a detector 41, which is implemented as a CCD camera. The beam splitter 39 is implemented as a dichroic beam splitter, and designed such that the light at the wavelength of the illumination light beam is reflected, whereas light at the wavelength of the detection light 35 may pass through.

The detection light data are transferred to a data processing module 45. Correlation of image objects with various layer depths of the sample from the first and the second detection light data ensues in the data processing module 45, and a 3-D data stack is produced, which is displayed as a three-dimensional image of the sample 11 or of the illuminated area of the sample on a display monitor 47 of a PC 49.

In order to measure and monitor the set polarization of the illumination light beam 9, a beam splitter 53 is arranged in the further beam path of the illumination light beam 9, which splits off a small portion of the illumination light beam 9 as a measuring beam 55 for polarization measurement. The measuring beam 55 is split by a polarization beam splitter 57 into an s-polarized partial beam 65, which is detected by a first detector 59, and a p-polarized partial beam 63, which is detected by a second detector 61. Conclusions may be drawn about the polarization of the illumination light beam 9 from the ratio of the light power measured by the first detector 59 and by the second detector 61. The rotational position of the λ/2 plate 33 is set according to user input via a feedback system, which is not shown. The processing module 67 receives the measurement signals from the first detector 59 and the second detector 61, as well as the user input settings from the PC, and adjusts the rotational position of the λ/2 plate 33 with the help of the servomotor 51. Memory is provided in the PC 49 in which are stored the sample-specific polarization settings for achieving various penetration depths such that the user may input penetration depths directly without having to determine the associated polarization setting.

Figure 2:
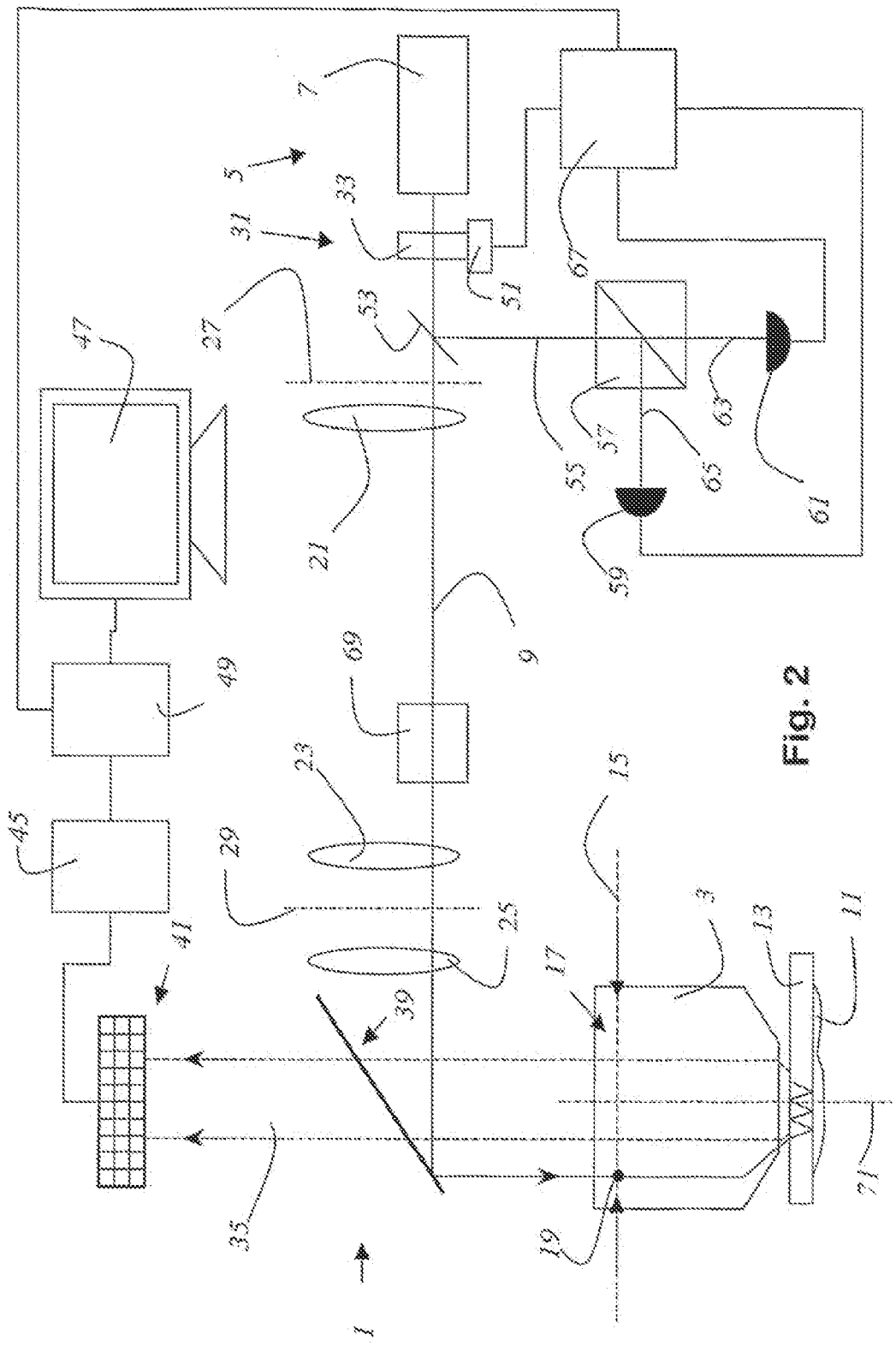
FIG. 2 shows a further microscope according to the invention.

FIG. 2 shows a further microscope according to the invention in which in addition to the adjustment mechanism 31 for setting the polarization of the illumination light beam, the spatial position of the focus 19 within the plane 15 of the objective pupil 17 may also be adjusted with the help of an adjustable beam deflector 69. The adjustable beam deflector 69 comprises a cardanically suspended rotating mirror, which is not shown. The distance of the focus 19 to the optical axis 71 of the objective 3 may be adjusted, and the penetration depth of the illumination light beam in the sample 11 thereby varied using the adjustable beam deflector 69.

Figure 3:
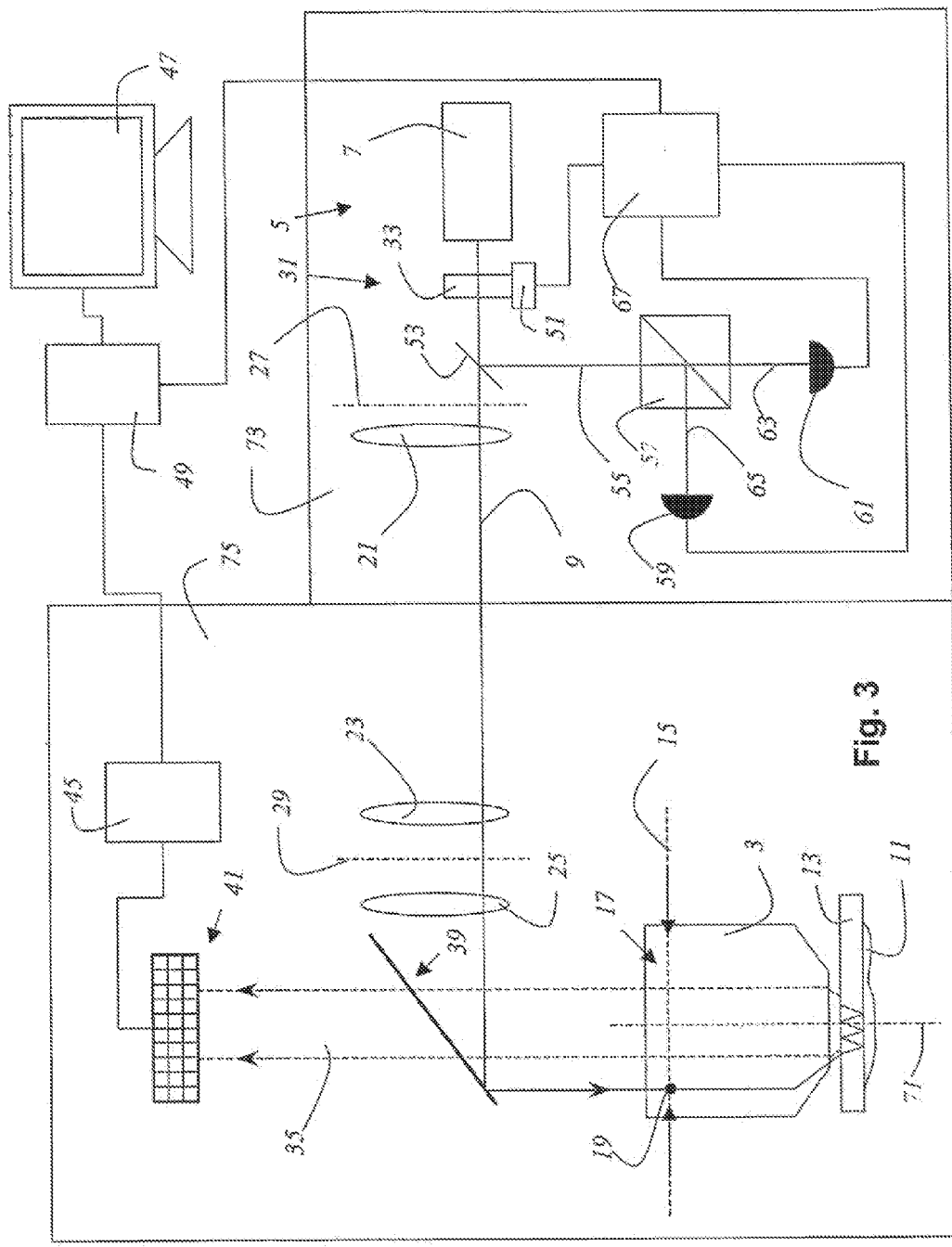
FIG. 3 shows a further microscope according to the invention with an illumination module.

FIG. 3 shows a further microscope according to the invention with an illumination module 73 that has already been coupled to an existent microscope 75 to achieve adjustable evanescent illumination with regard to penetration depth and with regard to illumination light power. The illumination module 73 exhibits a bayonet mount, which is not shown, for optical mounting to the microscope 75. Furthermore, the illumination module 73 also exhibits plugs, also not shown, for the electrical and electronic connections.

While this invention has been particularly shown and described with references to preferred embodiments thereof, it will be understood by those skilled in the art that various changes in form and details may be made therein without departing from the scope of the invention encompassed by the appended claims.

What is claimed is:

1. A microscope using a sample, comprising:
   an objective comprising an objective pupil,
   a light source generating an illumination light beam having a focus within the objective pupil and directed into the objective to produce evanescent illumination of the sample,
   a beam splitter in the illumination light beam splitting off a measuring beam from the illumination light beam, and
   a control mechanism controlling a depth of penetration of the evanescent illumination into the sample, comprising
   a polarization analyzer in the measuring beam determining polarization of the measuring beam and
   an adjustment mechanism changing polarization of the illumination light beam.

2. The microscope of claim 1, further comprising an adjustable beam deflector adjusting position of the focus within the objective pupil.

3. The microscope of claim 1, wherein the adjustment mechanism comprises a phase plate.

4. The microscope of claim 1, wherein the adjustment mechanism comprises a Faraday rotator or a Pockels cell or double-refractive material or a liquid crystal cell.

5. The microscope of claim 1, wherein the polarization analyzer comprises a polarization beam splitter.

6. The microscope of claim 5, wherein the polarization beam splitter splits the measuring beam into an s-polarized measuring beam and a p-polarized measuring beam.

7. The microscope of claim 6, wherein a first detector receives the s-polarized measuring beam and a second detector receives the p-polarized measuring beam.

8. The microscope of claim 1, further comprising an illumination module comprising the light source and the adjustment mechanism.

9. The microscope of claim 8, further comprising a microscope stand, wherein the illumination module is releasably coupled to the microscope stand.

10. The microscope of claim 1, further comprising a camera or a charge-coupled device (CCD) element or an electron-multiplying charge-coupled device (EMCCD) element for recording images.

11. The microscope of claim 1, further comprising a power-adjustment mechanism changing the light power of the illumination light beam.

12. The microscope of claim 1, further comprising a scanning microscope.

13. An illumination module for coupling to a microscope using a sample, the microscope having an objective pupil plane, the illumination module comprising;
   a light source generating an illuminating light beam having a focus in the objective pupil plane and producing evanescent illumination of the sample and
   a beam splitter in the illumination light beam splitting off a measuring beam from the illumination light beam, and
   a control mechanism controlling a depth of penetration of the evanescent illumination into the sample, comprising
   a polarization analyzer in the measuring beam determining polarization of the measuring beam and
   an adjustment mechanism changing polarization of the illumination light beam.

14. The illumination module of claim 13, further comprising an adjustable beam deflector adjusting position of the focus within the objective pupil.

15. The illumination module of claim 13, wherein the adjustment mechanism comprises a phase plate.

16. The illumination module of claim 13, wherein the adjustment mechanism comprises a Faraday rotator or a Pockels cell or double-refractive material or a liquid crystal cell.

17. The illumination module of claim 13, wherein the polarization analyzer comprises a polarization beam splitter.

18. The illumination module of claim 17, wherein the polarization beam splitter splits the measuring beam into an s-polarized measuring beam and a p-polarized measuring beam.

19. The illumination module of claim 18, wherein a first detector receives the s-polarized measuring beam and a second detector receives the p-polarized measuring beam.

20. The illumination module of claim 13 releasably coupled to a microscope stand of the microscope.

21. The illumination module of claim 13, further comprising a camera or a charge-coupled device (CCD) element or an electron-multiplying charge-coupled device (EMCCD) element for recording images.

22. The illumination module of claim 13, further comprising a power-adjustment mechanism changing the light power of the illumination light beam.

23. The microscope of claim 13, wherein the microscope comprises a scanning microscope.

* * * * *